May 12, 1936.  J. MANDAI  2,040,322
EDUCATIONAL CLOCK
Filed Oct. 20, 1934
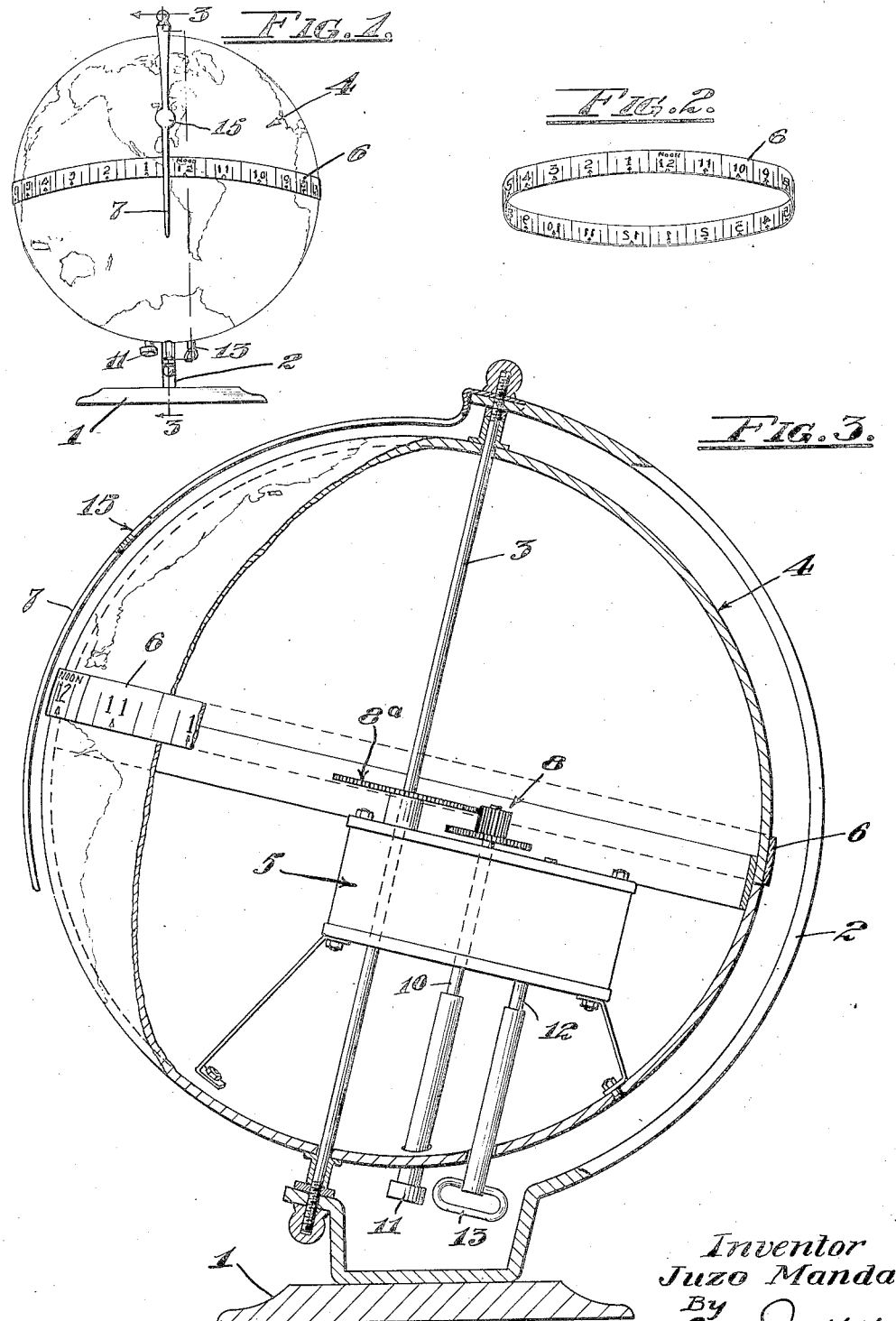
Inventor
Juzo Mandai Patented May 12, 1936

2,040,322

UNITED STATES PATENT OFFICE 2,040,322

EDUCATIONAL CLOCK

Juzo Mandai, Los Angeles, Calif.

Application October 20, 1934, Serial No. 749,216

3 Claims. (Cl. 58—44)

This invention relates to a timepiece which embraces a rotary globe-type world map and clock elements, arranged to indicate time in a particularly novel, interesting and highly educational manner whereby the timepiece will be of value in schools, serve the purposes of an ordinary clock and also permit of readily ascertaining time at various world locations for radio logging and other useful purposes.

An object of the invention is to provide a globe-clock, of the character described which will simultaneously indicate on the face of the globe, first, the exact hour (local time) at the geographical location of the observer, secondly, the location on the globe at which the time is 12 o'clock noon, thirdly, the geographical point at which the time is 12 o'clock midnight, and fourthly, the time at other points on the globe which points are between the local time indications and the noon and midnight indications.

Another object is to provide a clock of the character described which will be comparatively simple and inexpensive, reliable and accurate in operation and also have considerable amusement, ornamental, entertainment and practical value.

A further object is to provide a clock device such as described which is subject to being accurately and easily set to indicate "local" time at any given geographical point shown on the globe, whereby for example, if the observer is in Los Angeles, California, the clock may be set to show the "local" time at Tokyo, Japan, or Paris, France, instead of the local time at Los Angeles, for instruction purposes in schools; it being noted that these adjustments have particular significance because of the movement of the globe and the presentation of various geographical points with relation to a stationary indicator or pointer which latter "points" to the time and geographical locations alike.

The invention has other objects and features, some of which, with the foregoing will be set forth in the following description of the preferred form of the invention illustrated in the accompanying drawing. It is to be understood however, that changes as to minor details and arrangements of the form of the invention here illustrated and described may be made within the scope of the claims hereto appended.

Referring to the drawing:

Fig. 1 is a front elevation of the clock of this invention.

Fig. 2 is a perspective view of the time band.

Fig. 3 is an enlarged sectional view taken on the plane of line 3—3 of Fig. 1.

The present embodiment of the invention as shown in detail in the accompanying drawing, generally comprises a base 1, an arcuate standard 2 fixed to the base, a fixed axle 3, a world map globe 4 rotatably supported on the axle clockworks 5 within and arranged to rotate the globe counterclockwise, (when viewed from the north pole) an adjustable time dial or band 6 circumscribing the globe, and an arcuate indicator or pointer 7 fixed to the standard and extending partly around the globe opposite said standard.

Any suitable clock mechanism may be used provided through the gear train 8, including the gear 8ª which is fixed to the axle 3, causing the globe to make one revolution in a 24-hour period and in a counter-clockwise direction relative to the pointer, when viewing the globe from the north pole thereof. As here provided the globe will make one complete revolution relative to the pointer 7 in every 24 hours and the clockworks will rotate with the globe.

It is noted that the globe is formed in sections to permit of assembly of the clockworks therein. A setting shaft 10 has a handle 11 disposed at the lower side of the globe in position to be readily turned. A winding shaft 12 with its handle 13 is arranged in a like manner. On turning the shaft 10 the globe will turn.

The time or dial band 6 is of slightly less diameter than that of the globe and rests in place frictionally. As here shown it is numbered from 1 to 12 on the outer face thereof and from throughout each half thereof, there thus being two sets of 1 to 12 figures, one for the daylight hours and the other for the night hours, although it is obvious that the band could be numbered from 1 to 24 if desired.

To set the clock to keep the local time at the geographical point of the observer, say at New York, N. Y., the operator after winding the clock through manipulation of the shaft 12, now turns shaft 10 and thereby rotates the globe until New York on the globe is alined with the indicator 7. Then turn the band 6 to bring 12 noon mark thereon into alinement with New York and the pointer. Following this the operator manipulates the setting shaft to turn the globe to the extent that the exact hour (local time) figure is brought to alinement with the pointer. For example, if the time is actually 3 P. M. at New York when the clock is set as aforesaid, then when the adjustment is made to move the figure 3 on the band into alinement with the pointer, the latter will be alined with California on the globe and thus indicate that it is then approximately 12 noon say in Los Angeles, California.

To better visualize this, the pointer has a circular enlargement 15 thereon which represents the sun.

Thus it is apparent that when the clock adjusted as above noted, shows the figure 3 at the pointer it is 3 o'clock in New York, and 12 noon in Los Angeles since the Los Angeles location on the globe is then opposite or near the pointer. Likewise if the arcuate standard 2 is used as a pointer, it being diametrically opposite the pointer 7, it is 12 o'clock midnight at the geographical points which are alined with said arcuate standard.

It is now seen that the clock performs the threefold function of simultaneously showing local time, the geographical points at which it is 12 noon and the geographical points at which it is midnight.

The clock of this invention may be used to advantage in giving geography lessons and at the same time serve all the purposes of an ordinary clock. It may also be used in various other ways for instruction purposes as for example by setting the clock to tell the "local" time at London or some place other than the actual location of the clock. It may be used to advantage in making logs of radio reception, etc.

By the term counter-clockwise direction, I mean that the globe is turned in such manner relative to the pointer 7 that the numbers on the band 6 move past the pointer in an increasing sequence, to-wit 1, 2, 3, 4, 5, etc., while the observer views the globe from a point in front of the globe with the latter resting on an ordinary table or stand. If the observer wishes to view the lower part of the globe he merely peers beneath without moving the globe from its normal standing position as shown in Fig. 1, and if the upper part of the globe is to be viewed the observer changes his position without bodily moving the globe.

I claim:

1. In an educational clock, a rotary globe map, a support, a shaft fixed at its ends to said support, bearings fixed on the globe and providing for rotation of the latter on said shaft, clockworks fixed to and located interiorly of the globe for rotation around the shaft, a gear fixed on said shaft, a drive gear on said clockworks meshing with and arranged to have planetary movement relative to said fixed gear, means operable exteriorly of the globe for winding said clockworks and means operable exteriorly of said globe for turning said drive gear.

2. In an educational clock, a rotary globe map, a support, a shaft fixed at its ends to said support, bearings fixed on the globe and providing for rotation of the latter on said shaft, clockworks fixed to and located interiorly of the globe for rotation around the shaft, a gear fixed on said shaft, a drive gear on said clockworks meshing with and arranged to have planetary movement relative to said fixed gear, means operable exteriorly of the globe for winding said clockworks, means operable exteriorly of said globe for turning said drive gear, a pointer carried by said support and extending over the surface of said globe and a time band having hour designations, adjustably mounted on said globe.

3. In an educational clock, a base, an arcuate support thereon, a fixed shaft secured to the ends of said support, a globe map rotatably supported on said fixed shaft with the latter extended therethrough, a fixed gear on said shaft and disposed interiorly of said globe, a clockworks fixed interiorly of and to said globe for rotation around said shaft with the globe, a drive gear on and driven by said clockworks and meshing with said fixed gear for planetary movement relative thereto, a means operable at a point beneath said globe for turning said drive gear to thereby rotate the globe, and a clockworks winding means operable at a point beneath said globe.

JUZO MANDAI.